United States Patent [19]
Kellner

[11] Patent Number: 5,648,851
[45] Date of Patent: Jul. 15, 1997

[54] DEVICE FOR DETERMINING THE POSITION OF A BODY TO BE POSITIONED WITH RESPECT TO A REFERENCE BODY

[75] Inventor: Helmut Kellner, Moormerland, Germany

[73] Assignee: E.M.S. Technik GmbH, Leer, Germany

[21] Appl. No.: 522,347

[22] PCT Filed: Mar. 1, 1994

[86] PCT No.: PCT/DE94/00230

§ 371 Date: Sep. 14, 1995

§ 102(e) Date: Sep. 14, 1995

[87] PCT Pub. No.: WO94/21984

PCT Pub. Date: Sep. 29, 1994

[30] Foreign Application Priority Data

Mar. 17, 1993 [DE] Germany ............... 43 08 456.7

[51] Int. Cl.⁶ .................................. G01B 11/14
[52] U.S. Cl. .......................... 356/375; 250/237 R
[58] Field of Search ............... 356/373, 374, 356/375; 250/237; 33/707

[56] References Cited

U.S. PATENT DOCUMENTS

| | | | |
|---|---|---|---|
| 5,017,013 | 5/1991 | Kellner | 356/373 |
| 5,181,079 | 1/1993 | Klinger | 356/375 |
| 5,196,900 | 3/1993 | Pettersen | 356/141 |
| 5,404,226 | 4/1995 | Kellner | 356/373 |

FOREIGN PATENT DOCUMENTS

| | | |
|---|---|---|
| 39 09 855 | 9/1990 | Germany . |
| 39 09 856 | 10/1990 | Germany . |
| 41 04 602 | 6/1992 | Germany . |
| WO92/11507 | 7/1992 | WIPO . |
| WO92/14117 | 8/1992 | WIPO . |

*Primary Examiner*—Frank G. Font
*Assistant Examiner*—Michael P. Stafira
*Attorney, Agent, or Firm*—Burns, Doane, Swecker & Mathis, L.L.P.

[57] ABSTRACT

A device is disclosed for determining the position of a body to be positioned with respect to a reference body. The body to be positioned carries a graduation with optical detectors. The coordinates of a projection center are trigonometrically calculated from the projection angles formed between the projection center and at least three light marks projected onto the graduation, as well as from the distance between the light marks. The projection center is formed by the common intersection point between the optical axes or by the common intersection line between the optical planes of at least three diverging and/or converging projectors arranged on the reference body and which emit light beams or light planes. The light marks projected onto the graduation are detected by the optical detectors.

21 Claims, 3 Drawing Sheets

DEVICE FOR DETERMINING THE POSITION OF A BODY TO BE POSITIONED WITH RESPECT TO A REFERENCE BODY

BACKGROUND OF THE INVENTION

1) Field of the Invention

The invention relates to a device for determining the position of a body to be positioned relative to a reference point.

2) Description of Related Art

Position determining devices serve, for example, for controlling measurement and production machinery, and for determining paths between longitudinally shiftable objects such as measurement heads, handles or mounting arms. For these applications the precision with which these paths can be determined is of prime importance for the manufacturing precision of the automatic machinery.

A method and a device which makes a high degree of measurement precision possible independently from an exact conduction of a sampler are already known from DE-OS 39 09 856. For this, three marks of a graduated scale are evaluated by a sampler. For two marks, the projection angle formed between a projection center and these marks is independent from the distance the projection center is located above the marks and how far the projection center is laterally displaced. For three marks, the projection center is exactly determined via the additional projection angle between the projection center, this additional mark and one of the other marks. For a combination of two combination angles, there exists only one location at which the projection center can be situated.

So that the marks on this graduated scale can be reproduced on a projection surface of the sampler, the graduated scale must be evenly lit. This could occur through vertical illumination or back lighting. However, a lighting device requires additional space which stands in opposition to aspirations of miniaturization.

SUMMARY OF THE INVENTION

The invention has the present task of improving a position determining device such that the space requirement of the graduated scale can be reduced without loss of measurement precision.

This problem is solved with the device described in the overall concept of a device for determining the position of a body to be positioned relative to a reference body, the device comprising a body bearing a graduated scale including optical samplers, a reference body including at least three projectors which form projection angles to one another and the optical axes of which form at least one projection center, the three projectors projecting at least tree projected light marks on the graduated scale of the body, and means for trigonometrically calculating the coordinates of the at least one projection center from the projection angles between the projection center and at least three projected light marks as well as from a spacing distance between said at least three projected light marks as acquired by said optical samplers.

In the present invention, light marks are projected onto the graduated scale by means of projectors from which the position coordinates of the projection center are determined. More marks of a graduated scale are not reproduced on the projection surface of a separate sampler, but rather the graduated scale is itself a projection surface and includes an optical sampler for acquiring the imaged light marks. In this way, a separate lighting device as was required for lighting the marks of the graduated scale until now is done away with. The space requirement is thus significantly reduced.

Another advantage of the device in the invention is that, due to light beams or planes transmitted by the projectors, a distance-independent imaging clarity of the light beams or light planes on the optical samplers is achieved, through which a larger distance measurement range in the direction of the Z axis is achieved than with a fixed imaging lens system.

The projectors can be diverging, converging or diverging and converging.

For a combined diverging and converging arrangement, the coordinates of two spatially separated projection centers are determined which have, however, a set spatial relationship to one another. The concurrent determination of the coordinates of both projection centers makes it possible to compensate for measurement error and thus to improve the measurement precision.

For the design of the projectors, there are two configuration possibilities disclosed herein. One embodiment provides that the projectors in each case comprise a laser light source with a lens and a diaphragm; another embodiment provides that the projectors comprise a common laser light source with a light beam or light plane distribution lens and diaphragms.

The first configuration is higher in expenditure due to the required number of laser light sources, but offers the possibility that the projectors can be adjusted independently from one another. The latter configuration requires an increased expenditure for the adjustment, but the construction expenditure and the space requirement is less for this than for the first configuration.

Preferably, diaphragms are provided which are designed as apertured diaphragms for producing light beams and as slit diaphragms for producing light planes.

With this configuration of the diaphragms, it is managed to separate out a narrow area from the light sphere which only lights one or two sampler or pixel elements of the optical sampler in each case and thus makes a definitive evaluation possible, which guarantees a high measurement precision of the device.

Preferably, the optical samplers are formed from a CCD line.

Samplers of this kind distinguish themselves by small constructed size and very high resolution and can be obtained economically with high mechanical precision since they are manufactured in large quantities for use in handy scanners and telefax devices.

In accordance with a furtherance, the optical samplers are connected with a computer, which determines the mean maximum of the light beams (light planes) from the brightness distribution of a light beam (light plane) falling on several samplers and allocates this to the optical axis (plane).

Through this measure, the precision is not limited to the grid formed by the distances of the samplers, but rather makes it possible to obtain intermediate values.

For diverging arrangement of the projectors, the projection center lies on the side of the graduated scale facing the projectors and for converging projectors on the other side of the graduated scale.

By using converging as well as diverging projectors, two projection centers result, which have a set spacial alignment and thus make an error compensation possible by evaluating the measurement values together.

The computer connected with the optical sampler undertakes the calculation of the coordinates of the projection center according to the following trigonometric functions and equations:

$$X_0 = (Y_1 - Y_2) * \frac{(Y_1 * d_2 + Y_2 + d_1) * 2}{(Y_1 - Y_2)^2 + (d_1 + d_2)^2} + X_2$$

$$Z_0 = (d_1 + d_2) * \frac{(Y_1 * d_2 + Y_2 * d_1) * 2}{(Y_1 - Y_2)^2 + (d_1 + d_2)^2}$$

with $$d_1 = X_2 - X_1, d_2 = X_3 - X_2,$$

$$Y_1 = \frac{d_1}{2 * \tan \alpha}, Y_2 = \frac{d_2}{2 \times \tan \beta}.$$

For this, $\alpha$ refers to the projection angle between the projection center as well as a first and a second optical axis (plane), $\beta$ refers to the projection angle between the projection center as well as a second and a third optical axis (plane), $X_1$, $X_2$, $X_3$ refer to individual samples crossed by the optical axis (plane), with $X_2$ as the intersection with the middle vertical of the reference body (38), in a row of samplers and $d_1$ and $d_2$ refer to the means distances between the samplers $X_2$ and $X_1$, or $X_3$ and $X_2$.

At the same time coordinates can be determined namely in the direction of the graduated scale axis for one and perpendicular to the graduated scale axis for another.

A furtherance provides that a determination of the of the slope angle of the body to be positioned in relation to the reference body can also be calculated trigonometrically according to the following functions or equations:

$$f = \arctan\left(\frac{d_3}{Z_0}\right)$$

with $$d_3 = X_2 - X_0.$$

For this $d_3$ is the distance between the intersecting point $X_0$ of the vertical of the projection centrum to the graduated scale and the intersecting point $X_2$ of the center vertical of the reference body with the graduated scale.

There is also the possibility to determine three coordinates with a single combination of the graduated scale and projectors.

A furtherance provides that two graduated scales are provided arranged in a plane and a projector arrangement is allocated to each of these graduated scales.

In addition to a configuration with only one graduated scale and a projection arrangement, a rotational angle can also be determined vertical to this and one parallel to the plane in which the graduated scale lies. This determination takes place in each case by subtraction of the coordinates in the longitudinal direction of the graduated scale or in the distance of the graduated scale accounting for the mutual distances of the projection centers.

In another embodiment it is provided that the graduated scales are arranged under an angle of preferably 90° on the body to be positioned or reference body and both graduated scales are likewise allocated to a projector arrangement.

This configuration makes it possible to acquire coordinates in three coordinate directions and indicate two rotational angles.

Finally, a combination provides that two parallel graduated scales are arranged in a plane and an additional graduated scale is arranged at an angle to this plane. These three graduated scales are likewise allocated to projector arrangements in each case.

In this arrangement it is possible to indicate all three coordinate directions as well as all rotational angles about these coordinate directions. In this way the spacial position of a body to be positioned relative to a reference body can be indicated exactly in all six degrees of freedom.

Furtherances and advantageous configurations of the invention are found in the claims, the additional description and the drawings, with the help of which the invention will be explained in more detail.

DESCRIPTION OF THE PREFERRED EMBODIMENTS

Figure 1:
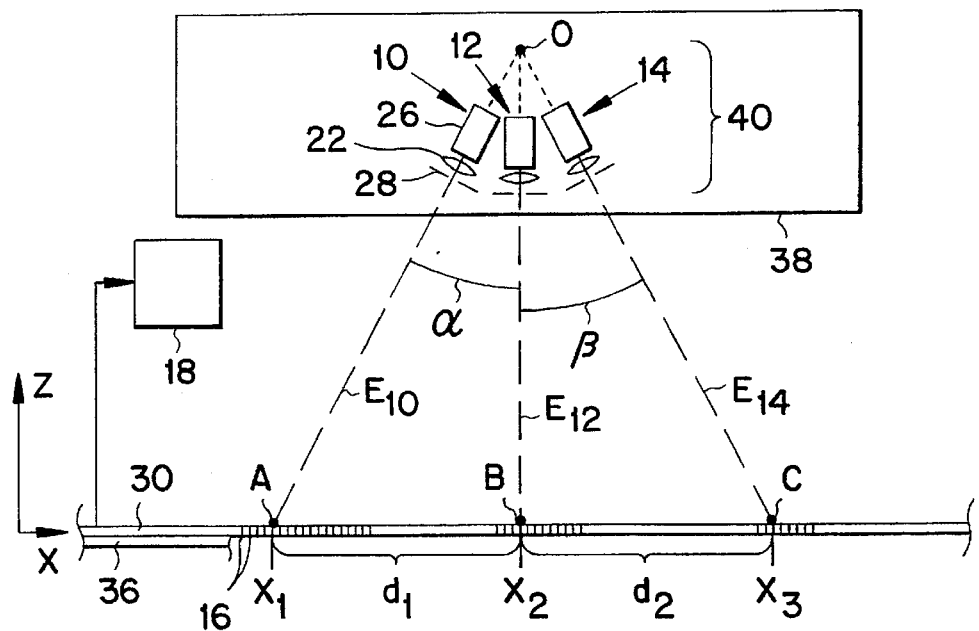
FIG. 1 a schematic side view of a reference body with projectors in diverging arrangement over a body to be positioned with a graduated scale, FIG. 2. a schematic side view corresponding to FIG. 1, but with converging projectors, FIG. 3 a schematic side view of a reference body over a body to be positioned with converging as well as diverging projectors, FIG. 4 another side view similar to FIG. 1 in which the body to be positioned is inclined against the reference body to illustrate the calculation formula for determining the slope angle and FIG. 5 a perspective view of a body to be positioned with graduated scales and a reference body with projectors for acquiring all the spacial parameters.

FIG. 1 shows a schematic side view of a device for determining the position of a body 36 to be positioned relative to a reference body 38, whereby the reference body includes three diverging projectors 10, 12, 14 which throw light planes on a graduated scale 30 of a body 36 to be positioned and in this way produce light marks A, B, C. The light marks A, B, C are acquired by optical samplers 16, which comprise sampler or pixel elements aligned in rows. The projectors 10, 12, 14 in each case individually comprise a laser light source 26 with a lens 22 and a slit diaphragm 28. Instead of the three projectors 10, 12, 14 depicted here, more than three projectors could also be present. For determining the coordinates $X_0$ and $Z_0$, at least three projectors are required, however. The projectors 10, 12, 14 are oriented such that the middle projector 12 projects a light plane, which coincides with the middle vertical of the reference body 38 while the light planes of the projectors 10 and 14 each take an angle $\alpha$ or $\beta$ to the light plane of the projector 12.

The light planes cross optical sampler 16, which are designed here in the form of a CCD line. Those samplers upon which the three light planes fall are referenced with $X_1$, $X_2$ and $X_3$. Coordinates are assigned to these samplers 16 which result from the mean distances of the individual samplers 16 and their ordinal number.

A computer 18, which determines the average maximum of the light plane from the brightness distribution of a light plane falling on several samplers 16. In this way the optical planes $E_{10}$, $E_{12}$, $E_{14}$ are determined with a higher resolution than the grid distance of the individual samplers 16, is connected to the samplers 16.

Furthermore, the computer 18 calculates the coordinates $X_0$ and $Z_0$, of the projection center O according to the following trigonometric functions and equations.

$$X_0 = (Y_1 - Y_2) * \frac{(Y_1 * d_2 + Y_2 + d_1) * 2}{(Y_1 - Y_2)^2 + (d_1 + d_2)^2} + X_2$$

$$Z_0 = (d_1 + d_2) * \frac{(Y_1 * d_2 + Y_2 * d_1) * 2}{(Y_1 - Y_2)^2 + (d_1 + d_2)^2}$$

with $$d_1 = X_2 - X_1,\ d_2 = X_3 - X_2,$$

$$Y_1 = \frac{d_1}{2 * \tan \alpha},\ Y_2 = \frac{d_2}{2 \times \tan \beta}.$$

For this, $\alpha$ refers to the projection angle between the projection center O as well as a first and a second optical axis (plane) $E_{10}$, $E_{12}$, prefers to the projection angle between the projection center O as well as a second and a third optical axis (plane) $E_{12}$, $E_{14}$, $X_1$, $X_2$, $X_3$ refer to individual samplers crossed by the optical axis (plane) $E_{10}$, $E_{12}$, $E_{14}$, with X2 as the intersection between the middle vertical of the reference body (38), in a row of samplers and $d_1$ and $d_2$ refer to the means distances between the samplers $X_2$ and $X_1$, or $X_3$ and $X_2$.

Figure 2:
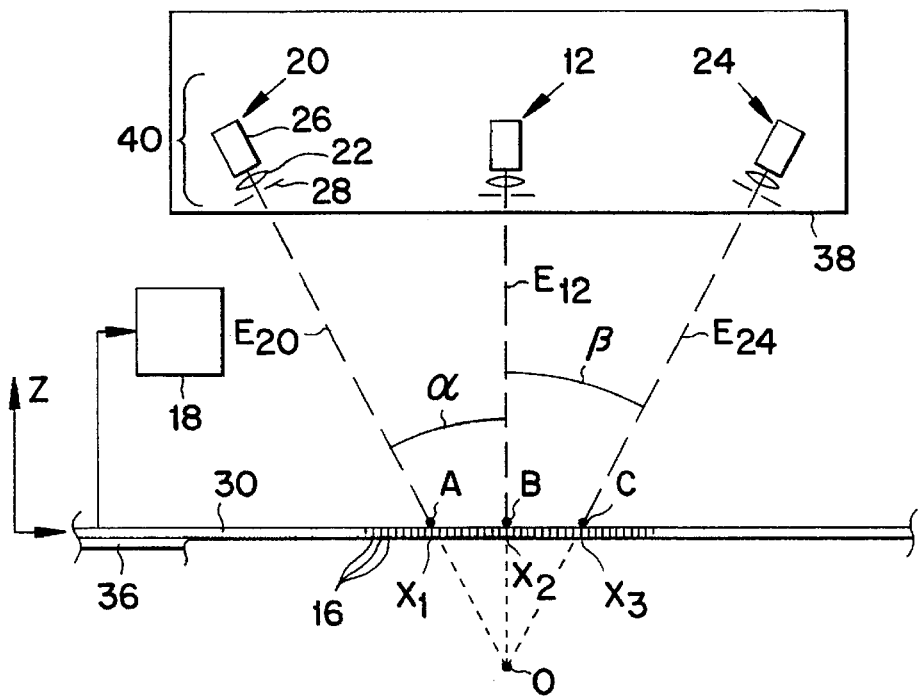

FIG. 2 shows another embodiment in which the projectors 20, 12, 24 are converging. The projection center O lies on the opposite side of the graduated scale 30 for this. The determination of the coordinates $X_0$, $Z_0$ takes place analogously to the embodiment in FIG. 1.

Figure 3:
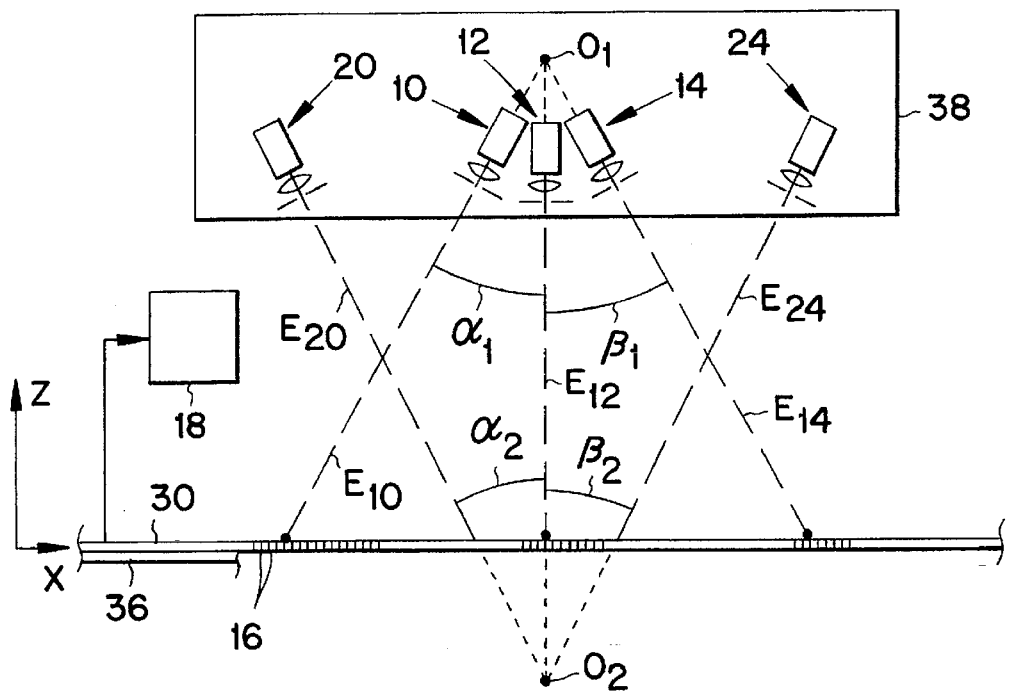
Figure 4:
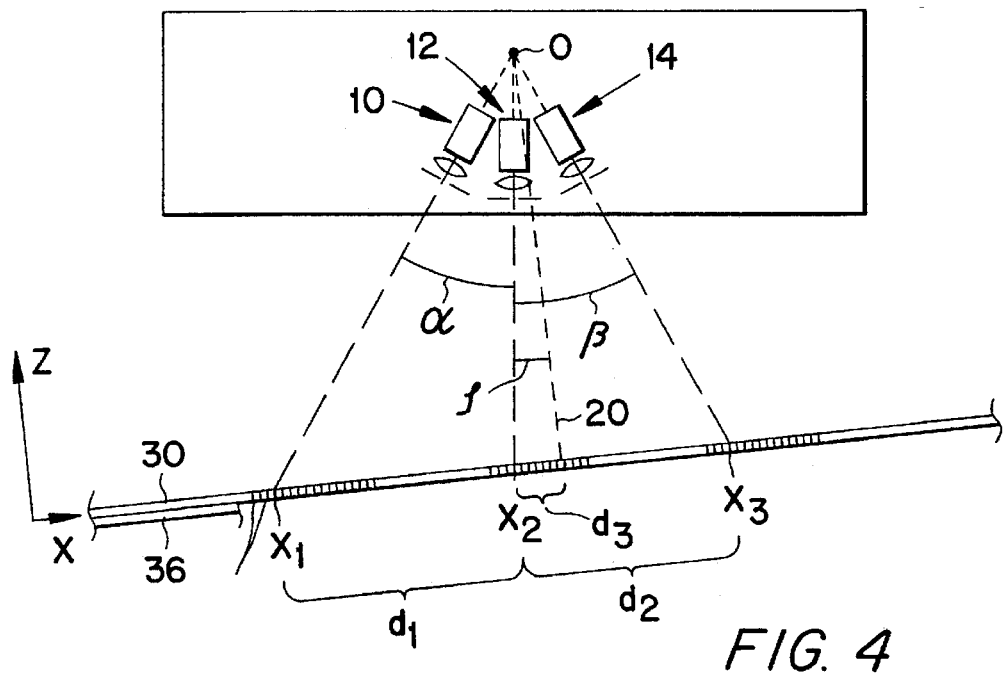

FIG. 3 shows another embodiment in which the reference body 38 includes converging and diverging projectors 10, 12, 14; 20, 24. For this the projectors 10, 12, 14 are diverging and the projectors 20 and 24 are converging including the projector 12.

In this arrangement, the projection center 0, which lies on the side of the graduated scale 30 facing the projectors 10, 12, 14; 20, 24, is determined as well as the projection center $O_2$ on the other side of the graduated scale 30. The associated projection angles $\alpha$ and $\beta$ bear the same index as the projection centers.

While the body 36 to be positioned is oriented parallel to the reference body 38 in the depictions in accordance with FIG. 1–3, FIG. 4 shows an embodiment similar to FIG. 1, in which the body 36 to be positioned is under the slope angle $f$, however. This slope angle $f$ is situated between the plumb of the projection center O on the graduated scale and the intersecting point of the middle vertical of the reference body 38 with the graduated scale 30. The calculation takes place according to the following trigonometric function:

$$f = \arctan\left(\frac{d_3}{Z_0}\right)$$

with
$$d_3 = X_2 - X_0.$$

For this $d_3$ is the distance between the intersection point $X_0$ of the plumb of the projection center (O) to the graduated scale (30) and the intersecting point $X_2$ of the center vertical of the reference body 38 with the graduated scale 30.

Figure 5:
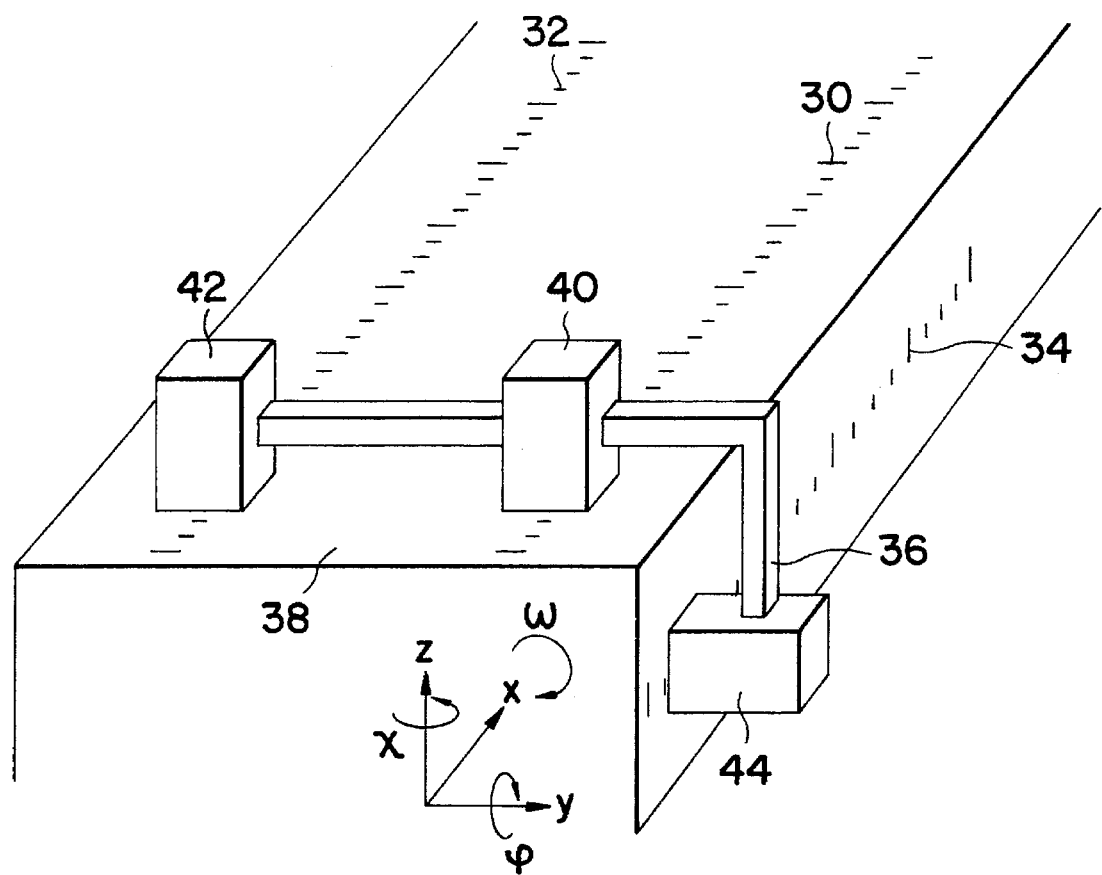

FIG. 5 shows a body 36 to be positioned with three graduated scales 30, 32 and 34 and three projection arrangements 40, 42, 44 on a reference body 38. Each of the projection arrangements 40, 42, 44 can be formed as is illustrated in FIGS. 1 through 4. The first 30 and the second graduated scale 32 are located on the broad side of the reference body 38. A third graduated scale 34 is arranged on the narrow side of the reference body 38. The narrow side and the broad side of the reference body 38 are oriented at a 90° angle. The exact position of the body 36 to be positioned in relation to the reference body 38 can be determined with the help of the light planes emitted by the projection arrangements 40, 42, 44 and of the sampling values determined by the samplers 16. To determine the X direction, the data of each of the three samplers of the graduated scales 30, 32, 34 is suitable in principle. They agree in regard to the X direction. To determine the Y direction, the data of the sampler of the graduated scale 34 is suitable, whereby the distance here between the projection arrangement 44 and the graduated scale plane is determined.

For determining the Z direction, the data of the sampler of the graduated scales 30 or 32 is to be evaluated.

While the distances are the same for parallel orientation of the body to be positioned and the reference body, differences occur for a rotational angle $\omega$. The rotational angle $\omega$ can thus be determined from the difference of the distances and the distance of the projection centers of the projection arrangements 40, 42.

The determination of the rotational angle $\omega$ takes place via the difference of the data of the sampler of the graduated scales 30 and 32 in the X-direction accounting for their mutual distances.

Finally, the rotational angle $f$ is calculated by the previously mentioned formula:

$$f = \arctan\left(\frac{d_3}{Z_0}\right)$$

The present invention has been disclosed by way of exemplary embodiments, to which the present invention is not limited. Variations and modifications will occur to skilled artisans which are within the scope of the invention as rected in the claim appended hereto.

The invention claimed is:

1. A device for determining the position of a body to be positioned relative to a reference body, comprising:
   a body bearing a graduated scale including optical samplers;
   a reference body including at least three projectors which form projection angles to one another and the optical axes of which form at least one projection center, said at least three projectors projecting at least three projected light marks on said graduated scale of said body; and
   means for trigonometrically calculating the coordinates of said at least one projection center from the projection angles between said at least one projection center and at least three projected light marks as well as from a spacing distance between said at least three projected light marks as acquired by said optical samplers.

2. A device as claimed in claim 1, wherein said at least three projectors emit one of light beams and light planes.

3. A device as claimed in claim 1, wherein said at least three projectors each include a laser light source with a lens and a diaphragm.

4. A device as claimed in claim 1, wherein said at least three projectors include a common laser light source with a light distribution lens and diaphragms.

5. A device as claimed in claim 4, wherein said diaphragms include at least one of apertured diaphragms for producing light beams and slit diaphragm for producing light planes.

6. A device as claimed in claim 3, wherein said diaphragm includes at least one of an apertured diaphragm for producing light beams and a slit diaphragm for producing light planes.

7. A device as claimed in claim 1, wherein said optical samplers include a CCD line.

8. A device as claimed in claim 2, wherein said optical samplers include a CCD line.

9. A device as claimed in claim 1, wherein said optical samplers are connected with said calculating means which determines the mean maximum of a projected light mark from the brightness distribution of a projected light mark falling on several optical samplers and allocates this to the optical axis.

10. A device as claimed in claim 2, wherein said optical samplers are connected with said calculating means which determines the mean maximum of a projected light mark from the brightness distribution of a projected light mark falling on several optical samplers and allocates this to the optical axis.

11. A device as claimed in claim 1, wherein said at least one projection center is a single projection center which lies on a side of said graduated scale facing the projectors where the optical axes of the projectors diverge, and is a single projection center which lies on a side of the graduated scale facing away from the projectors where the optical axes of the projectors converge.

12. A device as claimed in claim 1, wherein said calculating means is connected with the optical samplers and calculates coordinates of said at least one projection center according to the following trigonometric functions and equations:

$$X_0 = (Y_1 - Y_2) * \frac{(Y_1 * d_2 + Y_2 * d_1) * 2}{(Y_1 - Y_2)^2 + (d_1 + d_2)^2} + X_2$$

$$Z_0 = (d_1 + d_2) * \frac{(Y_1 * d_2 + Y_2 * d_1) * 2}{(Y_1 - Y_2)^2 + (d_1 + d_2)^2}$$

with $$d_1 = X_2 - X_1, d_2 = X_3 - X_2,$$

$$Y_1 = \frac{d_1}{2 * \tan \alpha}, Y_2 = \frac{d_2}{2 \times \tan \beta}$$

whereby, $\alpha$ refers to the projection angle between the projection center as well as a first and a second optical axis, $\beta$ refers to the projection angle between the projection center as well as a second and a third optical axis, $X_1, X_2, X_3$ refer to individual samplers onto which said projected light marks impinge in a row of samplers, with $X_2$ as the intersection with the middle vertical of the reference body, and $d_1$ and $d_2$ refer to the means distances between the samplers $X_2$ and $X_1$ or $X_3$ and $X_1$.

13. A device as claimed in claim 12, wherein said calculating means also calculates the slope angle f of the body to be positioned in relation to the reference body trigonometrically according to the functions and equations:

$$f = \arctan\left(\frac{d_3}{Z_0}\right)$$

with $$d_3 = X_2 - X_0$$

whereby $d_3$ is the distance between the intersecting point $X_0$ of the plumb of said at least one projection center to the graduated scale and the intersecting point $X_2$ of the center perpendicular line to the reference body with the graduated scale.

14. A device as claimed in claim 2, wherein said calculating means is connected with the optical samplers and calculates coordinates of said at least one projection center according to the following trigonometric functions and equations:

$$X_0 = (Y_1 - Y_2) * \frac{(Y_1 * d_2 + Y_2 * d_1) * 2}{(Y_1 - Y_2)^2 + (d_1 + d_2)^2} + X_2$$

$$Z_0 = (d_1 + d_2) * \frac{(Y_1 * d_2 + Y_2 * d_1) * 2}{(Y_1 - Y_2)^2 + (d_1 + d_2)^2}$$

with $$d_1 = X_2 - X_1, d_2 = X_3 - X_2,$$

$$Y_1 = \frac{d_1}{2 * \tan \alpha}, Y_2 = \frac{d_2}{2 \times \tan \beta}$$

whereby, $\alpha$ refers to the projection angle between the projection center as well as a first and a second optical axis, $\beta$ refers to the projection angle between the projection center as well as a second and a third optical axis, $X_1, X_2, X_3$ refer to individual samplers onto which said projected light marks impinge in a row of samplers, with $X_2$ as the intersection with the middle vertical of the reference body, and $d_1$ and $d_2$ refer to the means distances between the samplers $X_2$ and $X_1$ or $X_3$ and $X_1$.

15. A device as claimed in claim 14, wherein said calculating means also calculates the slope angle f of the body to be positioned in relation to the reference body trigonometrically according to the functions and equations:

$$f = \arctan\left(\frac{d_3}{Z_0}\right)$$

with $$d_3 = X_2 - X_0$$

whereby $d_3$ is the distance between the intersecting point $X_0$ of the plumb of said at least one projection center to the graduated scale and the intersecting point $X_2$ of the center perpendicular line to the reference body with the graduated scale.

16. A device as claimed in claim 1, wherein on said body two parallel graduated scale portions lie in one plane and two projector arrangements are arranged on the reference body and each made of said at least three projectors and are each allocated to a respective graduated scale.

17. A device as claimed in claim 2, wherein on said body two parallel graduated scale portions lie in one plane and two projector arrangements are arranged on the reference body and each made of said at least three projectors and are each allocated to a respective graduated scale.

18. A device as claimed in claim 1, wherein on the body two graduated scale portions are arranged at an angle of about 90° and two projector arrangements are arranged on the reference body and each made of at least three projectors respectively allocated to each graduated scale portion.

19. A device as claimed in claim 2, wherein on the body two graduated scale portions are arranged at an angle of about 90° and two projector arrangements are arranged on the reference body and each made of at least three projectors respectively allocated to each graduated scale portion.

20. A device as claimed in claim 1, wherein on the body three graduated scale portions are arranged, of which two lie in one plane and a third is oriented at an angle of 90° to both the other graduated scales and three projector arrangements are arranged on said reference body and each are made of at least three projectors allocated to respective graduated scale portions.

21. A device as claimed in claim 2, wherein on the body three graduated scale portions are arranged, of which two lie in one plane and a third is oriented at an angle of 90° to both the other graduated scales and three projector arrangements are arranged on said reference body and each are made of at least three projectors allocated to respective graduated scale portions.

* * * * *